United States Patent [19]
Heikkinen et al.

[11] Patent Number: 6,073,036
[45] Date of Patent: *Jun. 6, 2000

[54] MOBILE STATION WITH TOUCH INPUT HAVING AUTOMATIC SYMBOL MAGNIFICATION FUNCTION

[75] Inventors: Teuvo Heikkinen, Oulu; Petri Piippo, Karkkila; Harri Wikberg, Helsinki; Miika Silfverberg, Helsinki; Panu Korhonen, Helsinki; Harri Kiljander, Espoo, all of Finland

[73] Assignee: Nokia Mobile Phones Limited, Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/847,796

[22] Filed: Apr. 28, 1997

[51] Int. Cl.[7] .......................................... H04B 1/38
[52] U.S. Cl. ........................... 455/575; 455/566; 379/354
[58] Field of Search .................................... 455/575, 425, 455/566, 567; 345/63, 147, 173, 121, 130, 156; 379/93.19, 93.23, 354; 382/298, 451

[56] References Cited

U.S. PATENT DOCUMENTS

| | | | |
|---|---|---|---|
| 4,755,811 | 7/1988 | Slavin et al. | 340/731 |
| 4,790,028 | 12/1988 | Ramage | 382/47 |
| 5,016,002 | 5/1991 | Levanto | 340/756 |
| 5,119,079 | 6/1992 | Hube et al. | 340/712 |
| 5,201,034 | 4/1993 | Matsuura et al. | 395/155 |
| 5,266,949 | 11/1993 | Rossi | 341/22 |
| 5,335,276 | 8/1994 | Thompson et al. | 455/558 |
| 5,341,466 | 8/1994 | Perlin et al. | 395/139 |
| 5,408,060 | 4/1995 | Muurinen | 200/314 |
| 5,422,656 | 6/1995 | Allard et al. | 345/173 |
| 5,465,401 | 11/1995 | Thompson | 455/566 |
| 5,568,536 | 10/1996 | Tiller et al. | 379/58 |
| 5,615,384 | 3/1997 | Allard et al. | 395/800 |
| 5,815,142 | 9/1998 | Allard et al. | 345/173 |

*Primary Examiner*—Curtis A. Kuntz
*Assistant Examiner*—Binh K. Tieu
*Attorney, Agent, or Firm*—Ohlandt, Greeley, Ruggiero & Perle, L.L.P.

[57] ABSTRACT

A wireless user station (10), such as a cellular telephone, is provided with a touch sensitive input device, such as a touch-sensitive display (20) or a touchpad (23). A display device displays a plurality of symbols. A first location of a tactile input is detected and displayed symbols in the vicinity of the first location of the tactile input are magnified to occupy a larger display area. Subsequently, a second location of the tactile input is detected, thereby identifying a new position of the user's fingertip. After the second location on the touch sensitive screen remains constant, or after the user lifts the fingertip, the second location of the tactile input is reported and associated with the selected symbol.

19 Claims, 8 Drawing Sheets

INITIAL STATE

|   | 1 | 2 | 3 | 4 | 5 | 6 | 7 | 8 | 9 | 10 |
|---|---|---|---|---|---|---|---|---|---|---|
| 1 | A | B | C | D | E | F | G | H | I | J |
| 2 | K | L | M | N | O | P | Q | R | S | T |
| 3 | U | V | W | X | Y | Z |   |   |   |   |
| 4 |   |   |   |   |   |   |   |   |   |   |
| 5 | 1 | @ | # | $ | % | ^ | & | * | ( | ) |
| 6 |   |   |   |   |   |   |   |   |   |   |
| 7 |   |   |   |   |   |   |   |   |   |   |
| 8 | K1 | K2 | K3 | K4 | K5 | K6 | K7 | K8 | K9 |   |
| 9 | S1 | S2 | S3 | S4 | S5 | S6 | S7 | S8 | S9 |   |
| 10 | R1 | R2 | R3 | R4 | R5 | R6 | R7 | R8 | R9 |   |

FT — 20

MAGNIFIED (ZOOM)

| | K2 | K3 | K4 | K5 | K6 |
| | S2 | S3 | S4 | S5 | S6 |
| | R2 | R3 | R4 | R5 | R6 |

MOBILE STATION WITH TOUCH INPUT HAVING AUTOMATIC SYMBOL MAGNIFICATION FUNCTION

FIELD OF THE INVENTION

This invention relates generally to radiotelephones and, in particular, to radiotelephones or mobile stations, such as those capable of operation with a cellular network, having a touch sensitive input for the detection of user inputs.

BACKGROUND OF THE INVENTION

Portable radiotelephones for use in cellular networks are sometimes equipped with touch sensitive displays, or touch screens. The concept behind a touch screen is to facilitate the selection of a symbol by the simple act of pointing to, and touching a displayed symbol, rather than typing a particular keystroke on a keyboard.

Because of the relatively small size of a telephone display that is a result of the tendency to miniaturize portable equipment, there is generally not enough room on the face of a display to: (a) depict all the symbols available to the user for the operation of the telephone; and/or (b) address each symbol by human fingertip means.

As an example of the former, all symbols such as numerals, alphanumerics, menu items, special icons, etc. that are related to telephone functions that may be available for use on a portable telephone cannot generally be allocated enough display pixels on the touch sensitive part of the display to visually distinguish and uniquely define each symbol. One approach of the prior art to accommodate large numbers of symbols on a single display was to allocate a fixed, small number of display pixels for each telephone function on a touch sensitive screen. The difficulty with this approach is that sometimes the number of pixels allocated is insufficient to allow the easy identification of the character or function to be activated by touching the specific area. That is, with a limited number of pixels it may be difficult to create a sufficient number of visual features of a symbol to allow its unambiguous identification.

Another problem stems from the small amount of display area allocated to each symbol, legend, and/or related function on a touch sensitive screen for its activation. This limitation arises because the total area necessary to accommodate sufficient space to accommodate the tip of the human finger, for each symbol, would typically exceed the total area of the display itself. When the symbols are made smaller and spaced closer together, the user's fingertip will typically cover one or more adjacent symbols.

With fingertip usage the displayed symbols or touch areas are required to be relatively large (e.g., 7 mm×7 mm for index finger use with a 2% error rate). In the past this has forced the use of a stylus, instead of the more natural finger, to achieve acceptable error rates.

That is, using the small area allocated in a touch sensitive display for a multitude of symbols cannot readily accommodate the dimensions of a human fingertip, generally requiring the user to operate the interface using a pointing device, such as a stylus, pencil, pen, etc., that must be placed precisely over the desired character or function to be used to uniquely identify the desired input to the telephone. At times, the precision required in placing the stylus may challenge the coordination skills of the user, especially in a moving train, plane, or automobile where the motion of the vehicle makes it difficult to control the relative position of the stylus with respect to the touch screen. Furthermore, the use of a stylus may be objectionable to some users, and in some situations may present a safety issue.

The foregoing problems will also arise if one were to employ some means other than a touch sensitive display to provide a tactile, non-keypad input to a mobile telephone, especially if a small display device is used.

OBJECTS OF THE INVENTION

It is thus a first object of this invention to provide an improved method for depicting various symbols on a touch sensitive display of a radio telephone, thereby allowing a user to visually distinguish among a number of symbols on the display.

Another object of the invention is to facilitate the manual designation of a symbol on a display, such as numerals, alphanumerics, menu items or other special icons related to telephone functions or other user generated data or instructions.

Another object of the invention is to provide an improved method for designating symbols that offers a large input area on a display for designating a desired symbol, thereby facilitating fingertip control in a high vibration environment where the accuracy of the fingertip designation of a symbol is limited because of relative motion between the fingertip and the surface of a tactile input device such as, but not limited to, a touch screen.

SUMMARY OF THE INVENTION

The foregoing and other problems are overcome and the objects of the invention are realized by methods and apparatus in accordance with embodiments of this invention. A method and apparatus of this invention is disclosed for operating a wireless mobile or user station having a touch sensitive input device and a display, the display being capable of displaying a plurality of symbols. Each of the symbols may have a display attribute. The method comprises a series of steps. A first step detects a first location of a tactile input on the touch sensitive input device, the tactile input generally being created by applying fingertip pressure to the face of the display for a touch screen embodiment or to a surface of touch pad. Next, the displayed symbols in the vicinity of the first location corresponding to the tactile input are automatically magnified. The magnification gives more area on the display for the symbol(s), thereby facilitating manual symbol designation, as well as improving the visual representation of the symbol on the display. As the fingertip moves to designate the desired symbol on the magnified area of the display, a second location of the fingertip-induced tactile input is detected. The detection of the tactile input at the second location is made after the originally displayed character is magnified. In one embodiment, as soon as the tactile input remains constant for a predetermined period of time, the second location, which is indicative of the selected symbol, is reported, In another embodiment the second location is reported when the fingertip is lifted from the touch sensitive surface. Also, concurrently with reporting the detected second location, the attribute of the symbol displayed at the second location may be changed to inform the user of the selection of the fingertip-designated symbol.

In this invention the magnifying step magnifies the symbols by a factor of typically between 1.1 and 10. The time interval between the time a tactile input is detected at the second location and the time the position of the second location is reported (and the attribute of the display at the second location is changed), can be from some fraction of a second to several seconds. Also, the magnifying step can be performed more than once to accommodate situations wherein a particular symbol cannot be uniquely identified after only a single magnification step is performed. In general, if after a first magnification the fingertip is located on a boundary of two or more symbols, another one or more magnification steps can be performed.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1A:
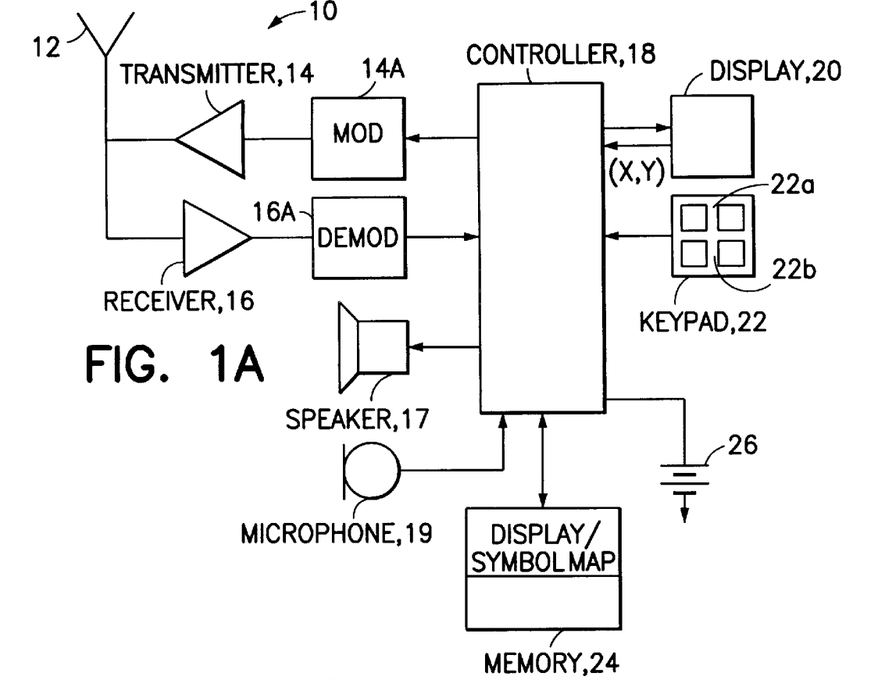
FIG. 1A is a block diagram of a mobile station that is constructed and operated in accordance with a first embodiment of this invention.
Figure 2:
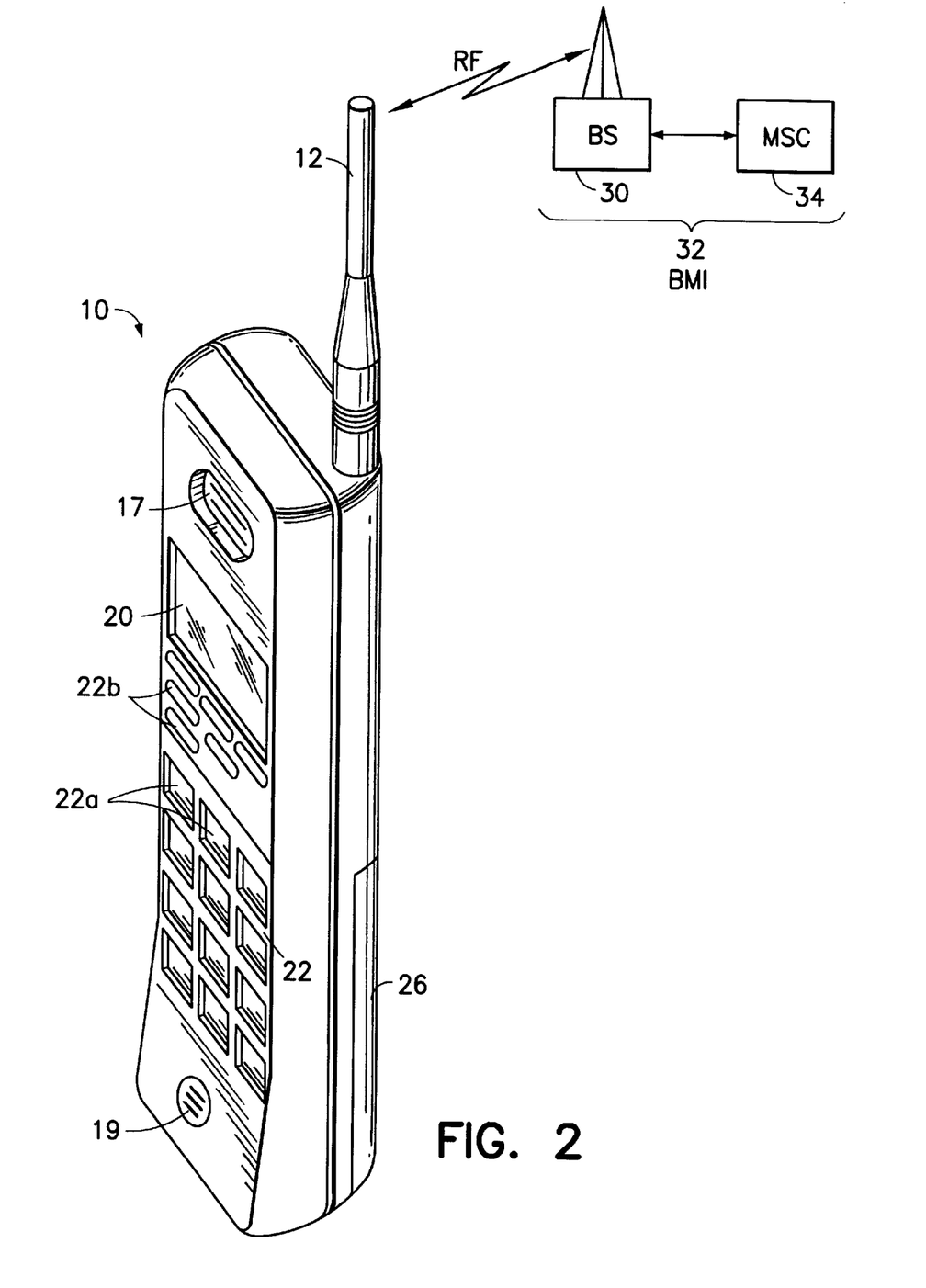
FIG. 2 is an elevational view of the mobile station shown in FIG. 1A, and which further illustrates a cellular communication system to which the mobile station is bidirectionally coupled through wireless RF links.

Reference is made to FIGS. 1A and 2 for illustrating a wireless user terminal or mobile station 10, such as, but not limited to, a cellular radiotelephone or a personal communicator, that is suitable for practicing this invention. The mobile station 10 includes an antenna 12 for transmitting signals to, and for receiving signals from, a base site or base station 30. The base station 30 is a part of a cellular network comprising a Base Station/Mobile Switching Center/Interworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a touch sensitive display 20, and possibly a second user input device, typically a keypad 22, all of which are coupled to the controller 18. The keypad 22, although optional for use in this invention as some of its functions may be included in the display 20, may include the conventional numeric (0–9) and related keys (#,*) 22a, and other keys 22b used for operating the mobile station 10. These other keys 22b may include, by example, a SEND key, and various menu scrolling and soft keys. When the keypad 22 is not included as part of the mobile station 10, the touch sensitive display screen 20 provides an equivalent user interface function as the keypad 22. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. Symbols entered from the display 20 are buffered in the memory 24. A portion of the memory 24 may also used as a display screen buffer.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of air interface standards, such as IS-136, GSM and IS-95. Conventional AMPS mobile stations can also benefit from the teaching of this invention. It should thus be clear that the teaching of this invention is not to be construed to be limited to any one particular type of mobile station or air interface standard.

The operating program in the memory 24 includes routines to present messages and message-related functions to the user on the display 20, typically as various menu items. The memory 24 also includes software routines for execution by controller 18 for implementing the method of this invention, described below in relation to FIG. 3 and FIGS. 4A, 4B, and 5A–5E.

In this embodiment of the invention, display 20 is a touch sensitive display where the location of, for example, a pressure disturbance or tactile input, such as the presence of a fingertip placed on the display, will send to controller 18 the (X,Y) display coordinates identifying where display 20 is touched. The X,Y resolution is a function of the display 20. This determination of the position can be cyclical, at regular intervals, for example every 10 milliseconds. For example, if the display 20 is touched in the left upper most corner, display 20 will send two numbers, for example, 1, 1, identifying the X=1, Y=1 element position of the display area where the presence of a tactile input, such as a fingertip or some other pointing means, has been sensed.

While tactile input detection is described herein as one embodiment of the invention, it is only one possible method for detecting the presence of a fingertip on a touch sensitive screen. Other methods could be employed, such as sensing a presence/absence, and/or an amount of pressure applied by a fingertip or stylus.

One suitable type of touch screen is manufactured by Nissha Printing Co., Ltd., Electronics Division, and is known as a "Fine Touch" touch screen. This particular analog touch screen uses a transparent resistive membrane. The use of digital touch screens having a transparent switch matrix is also within the scope of this invention.

It should be appreciated that the position resolution of a tactile input on the touch sensitive screen cannot be more accurate than one area of resolution, or element, herein for example about 5 mm by 5 mm (25 millimeters square). By example, and assuming the analog touch screen embodiment, if two, four bit analog to digital converters are used to encode the location of the tactile input, the resulting position resolution is 16 by 16 resolvable locations.

Figure 3:
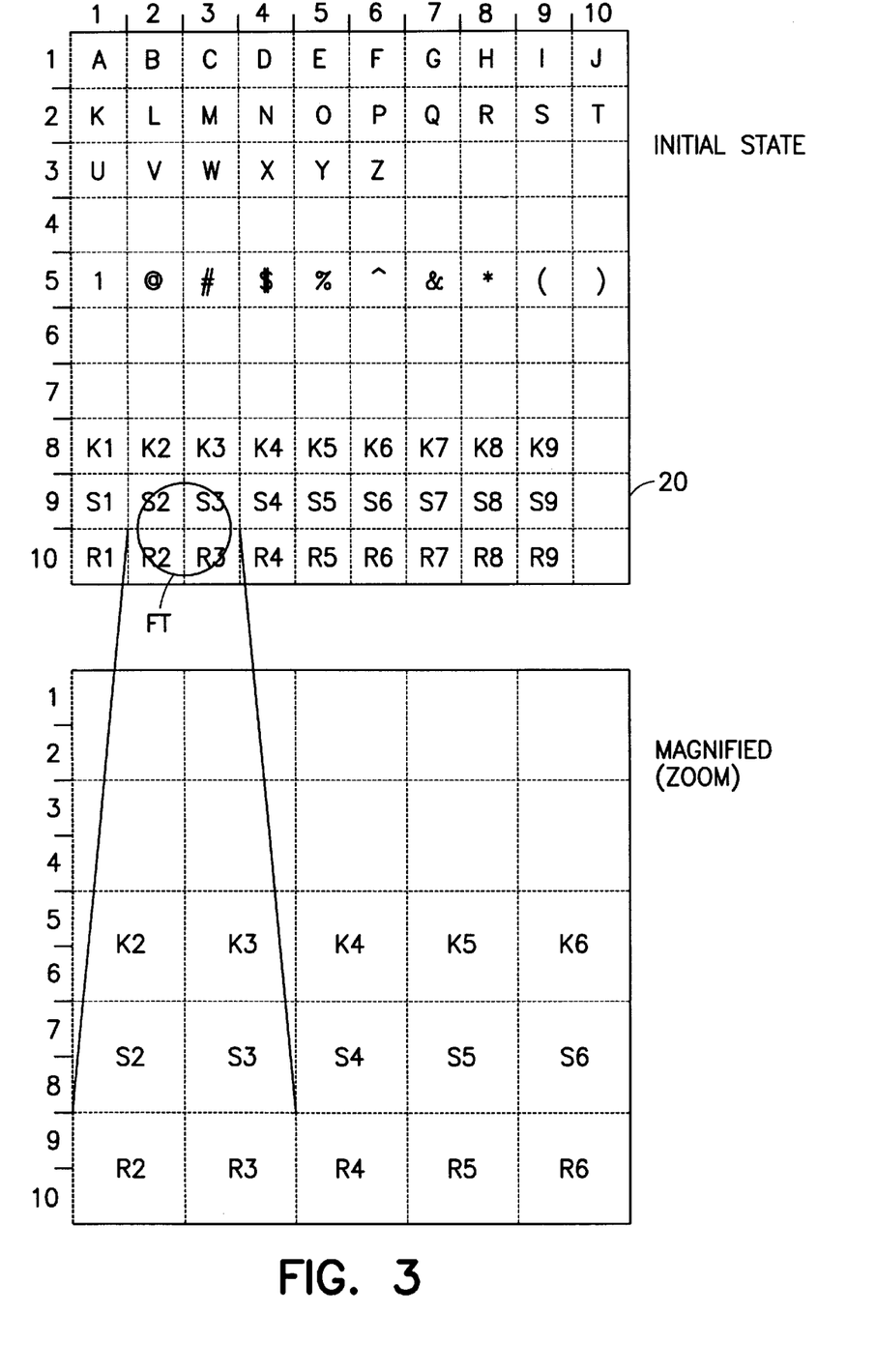
FIG. 3 is a detail of the display used in FIG. 1A showing the display in its initial state and in its magnified state, as described in the preferred embodiment.

As shown in FIG. 3, for example, in a touch sensitive display of 50 mm by 50 mm dimensions, 100 areas of resolution or elements, shown as a 10 by 10 matrix, is capable of reporting the occurrence of tactile inputs and the related positions referenced to the display's X-Y coordinate frame. The fingertip activation (tactile input) positions from display 20 to controller 18 are reported, for example, as two numbers X,Y corresponding to the X,Y position within the 10 by 10 matrix. The reported position of the fingertip activation, corresponds to the one 5 mm by 5 mm element, within the exemplary 50 mm by 50 mm touch sensitive screen (having 100 resolvable positions).

As further shown in FIG. 3., in its initial state, each of the 100 areas of resolution, or (sensing) elements, of the display shows a particular symbol, such as, for example, upper case ASCII characters A,B,C, . . . Z, icons, functions etc. The cited examples of symbols are only an example of the type of characters that may be displayed, in this case to substitute, or supplement, the character-based keypad 22. Other symbols that can be contained within an area of display resolution are, for example, Kanji, Turkish, Arabic, Russian or other language specific characters, or any other icon, numeric, or legend that will fit, in abbreviated or complete form, on the surface defined by each pressure sensing element of the 10 by 10 matrix. Each displayed symbol is composed of a number of pixels of display 20 and fits within one of the 100 pressure sensing elements present in display 20.

In FIG. 3 it is shown that a fingertip FT is initially placed at the intersection of characters S2, S3, R2, and R3. S2 is displayed in (sensing) element row 9, column 2 (9,2), while S3 is displayed in element row 9, col 3 (9,3). Similarly, character R2 is displayed in element (10,2) while R3 is displayed in element (10,3). Upon sensing the presence of a tactile input in one of, or in more than one, or at the intersection of, elements (9,2), (9,3), (10,2), and (10,3), controller 18 refreshes and updates touch sensitive display 20 so that element S2 is now re-displayed in a magnified (zoom) fashion in an area corresponding to four display elements (7,1), (7,2), (8,1) and (8,2). Similarly characters S3, R2 and R3 are also magnified, as shown in the magnified portion of FIG. 3, to occupy a display area, for example, four times their original size. It is now evident that since the original characters displayed in one element have been magnified to occupy the area of four elements each, the display area of the character itself is four times larger than the original, hence making it more readable and easier for the user to identify. Furthermore, since the area occupied by the magnified character is larger, comprising four resolvable sensing elements, it has become easier to designate by fingertip, since the center of the fingertip can be placed more readily over the symbol without accidentally activating another adjacent symbol.

The controller 18 is assumed to store in the memory 24 a mapping between display coordinates and displayed symbols, and changes the mapping as a function of magnification level.

The magnification ratio is not limited to a factor of 2 as described. The ratio can be from as little as 1.1 to, by example, a factor of 10. A factor of 10 is applicable when the display having 100 elements has to be filled with, for example, a single symbol requesting the immediate action of the user. An alert or visual alarm function can thus be shown in conjunction with, for example, an audible alert or alarm.

Figure 4A:
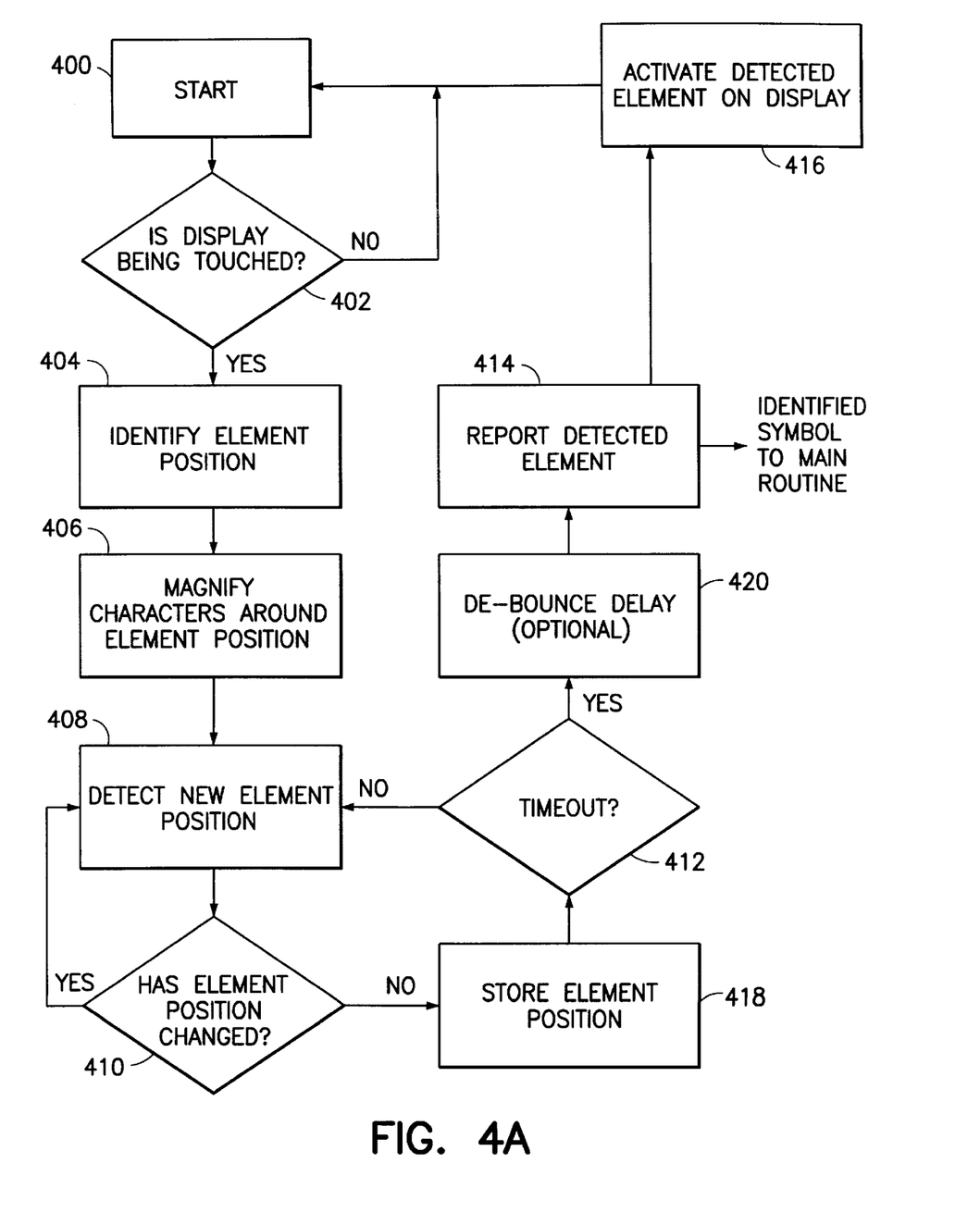
FIG. 4A shows a logic flow diagram of one embodiment of this invention, wherein a symbol is selected after a period wherein the fingertip remains stationary on the touch sensitive surface.

Referring to FIG. 4A, a first method for operating the display 20 comprises a series of steps as described below. Upon power up of the mobile station 10, a software subroutine starts as shown at step 400 in controller 18. Controller 18 receives periodic reports, for example, every 10 msec, from display 20 as to the presence or absence of tactile input indicative of the presence of a fingertip on the display. In other embodiments of this invention the controller 18 may receive a report only when the display 20 is actually touched. In a further embodiment of the invention it may be the controller's responsibility to periodically poll the display 20 to determine if and where a tactile input has been sensed. Thus, although the invention is described in the context of a display that regularly outputs a signal to the controller 18, those skilled in the art will recognize that this is only one possible mode of operation.

In step 402, if no input is detected on the touch sensitive display 20, the routine returns to start 400. If however, a tactile input is detected on display 20 by step 402, the corresponding display element(s) are identified in step 404. As discussed above with regard to the example shown in FIG. 3, step 404 may detect fingertip pressure at display element positions (9,2), (9,3), (10,2) and (10,3). In response to the results from step 404, in step 406, the symbols displayed in display element positions (9,2), (9,3), (10,2) and (10,3) are magnified (zoomed) to, for example, double the size of each of the four originally displayed symbols. This magnification causes the originally displayed four symbols to be redrawn, and magnified by controller 18 over a 16 display element area, as shown in FIG. 3. As further shown in the example in FIG. 3, the information originally displayed at location (9,2) is now magnified to cover display element positions (7,1), (7,2), (8,1) and (8,2). Following magnification step 406, the display is as shown in FIG. 3 in the magnified position for the fingertip location shown at FT. The magnification of the original display gives the user immediate visual feedback that the presence of the fingertip has been detected at a particular, first position, and a larger area is displayed for the fingertip to move to and designate a character at a second position.

It should be realized that if the controller 18 is capable of unambiguously identifying a selected symbol (e.g., a symbol displayed in isolation), then the magnifying and subsequent steps need not necessarily be performed. In this case Block 404 is modified accordingly to determine if the location of the fingertip can be unambiguously correlated with one displayed symbol. If yes, control can pass immediately to Block 414 to report the user-designated symbol. However, it may be desirable when the symbols are displayed in an unmagnified form to always employ the zoom function, even when only one selected symbol is unambiguously identified, in order to avoid the possibility that the user has indicated the wrong symbol.

It is assumed that the user now repositions or slides the fingertip in the magnified area to a second position, until the desired character to be input into the mobile station 10 is reached. The movement of the fingertip to a second position is detected in step 408 wherein the position of the fingertip is detected within one of the 100 (10 by 10 matrix) touch sensitive elements of display 20. If the location of the fingertip is no longer changing, as sensed in the 10 by 10 matrix, it is assumed the fingertip is no longer moving over the display 20 and that the user has selected the desired character. Step 410 identifies a change in element position by comparing the previous value of the position of the tactile input with the latest value of the position of the tactile input. If the two positions are not the same, the method returns to step 408 to detect the new element on the display being activated. Conversely if the position has not changed, step 410 directs the display element containing the last tactile input detection to be stored in memory 24, as shown in step 418. It is understood that the search for a change in fingertip position, as reported by the display 20, will continue for as long as there is a variation between successive fingertip locations determinations, as indicated by the loop formed by step 412, 408, 410 and 418. This provision assures that if the user momentarily stops moving the fingertip on the display, and then continues moving again without lifting the fingertip off the display, a false reading is avoided.

In this embodiment of the invention, as soon as the location of the tactile input on the display 20 stays constant for some predetermined period of time (step 412), for example, 2 seconds, it can be assumed that the user has completed the selection of the desired symbol and that the last location (stored in memory 24) indicates the desired symbol. After a short delay, of, for example, one to 500 milliseconds, as shown in optional step 420, to provide "de-bouncing" of fingertip motion, the element position where the tactile input was detected last is reported, as shown in step 414, to a routine that identifies the manually designated symbol based on the last reported fingertip position and the current mapping between the display screen coordinates and the displayed symbols.

In step 412, a sequence of tactile input reports from step 410 are compared for a time duration of, for example, 2 seconds. The final position reported from step 412 to step 414 is made only after a sequence of successive fingertip location reports are equal in value. As was indicated above, the de-bounce delay step 420 is optional.

Next, in optional step 416, the symbol and associated display element(s), where the user input was reported in step 414, can be made to change in attribute, as for example, to flash repeatedly, or change background, to inform the user of the selection of that symbol. The user, having visual feedback as to the symbol recognized by controller 18 as an input from touch sensitive display 20, can then proceed to designate the next symbol, such as a character, legend, icon or other screen displayed detail. Typically, the display will first be automatically returned to the unmagnified format (as in FIG. 3).

Figure 4B:
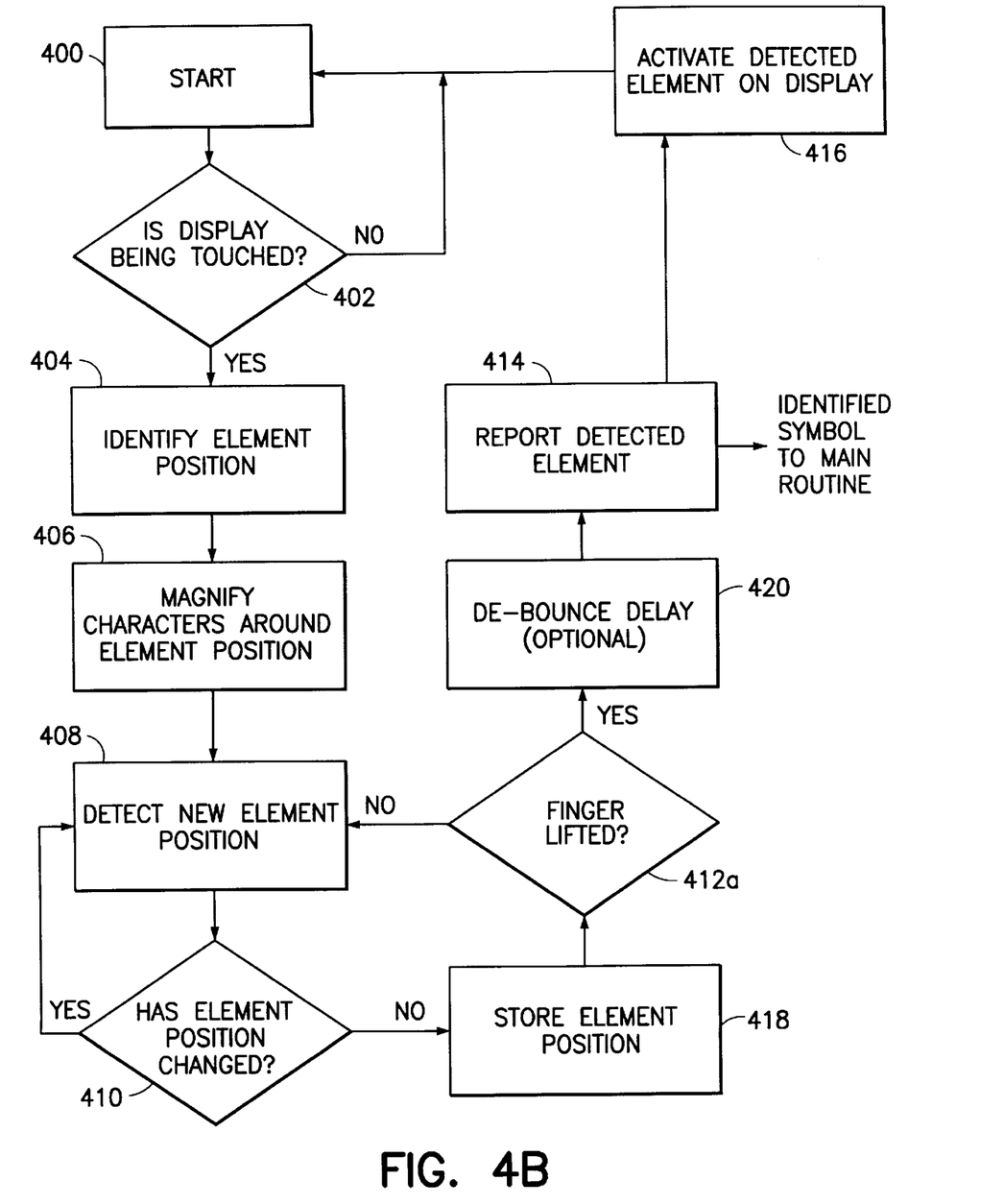
FIG. 4B shows a logic flow diagram of another embodiment of this invention, wherein a symbol is selected after the fingertip is lifted from the touch sensitive surface.

FIG. 4B illustrates a further embodiment of this invention, wherein the Block 412 is modified to be a Block 412a. In this embodiment the controller 18 detects that the user's fingertip has been lifted from the touch sensitive display 20. The detection of the user lifting his or her finger is interpreted as the user selecting the symbol at the corresponding display position.

It can be appreciated that this invention facilitates the selection of numbers when originating a phone call, or when it is desired to store a phone number in the mobile station 10. This invention is particularly advantageous when the user wishes to compose (or respond to) an alphanumeric text message, such as one to be sent from the mobile station 10 using a Short Message Service (SMS) teleservice.

Figure 1B:
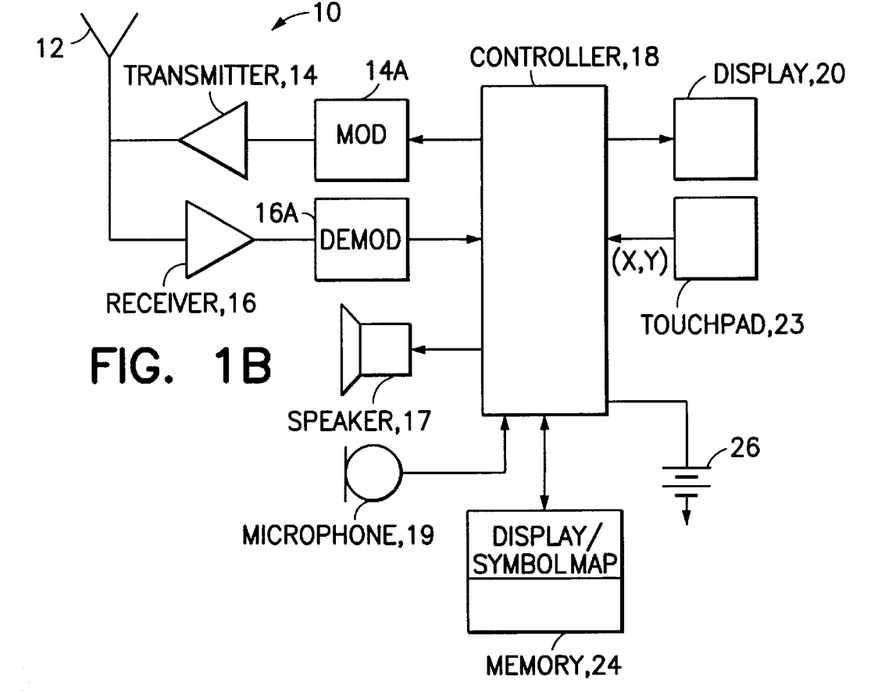
FIG. 1B is a block diagram of a mobile station that is constructed and operated in accordance with a second embodiment of this invention.

Referring now to FIG. 1B, in a second embodiment the mobile station 10 is provided with a conventional LCD display 20, the keypad 22 is eliminated (optionally), and a touchpad 23 is provided. The touchpad 23 can be a known type of device, used with some portable computers, that outputs X and Y coordinate information in response to tactile input from a user, either by fingertip or stylus. The touchpad 23 can be a separate device that is interfaced with the mobile station 10 through a cable and/or connector, or may be integral with the mobile station 10 and located on a cover of the phone, on a pull-out or slide-out planar member, or on a flip-down portion of the phone's cover or other structural member.

In a further embodiment of the invention the display 20 of FIG. 1B may be a so-called "virtual display" or "virtual screen", such as a headset-mounted type of monitor that employs a scanned array of LEDS to generate a projection display. One such device is available from Reflection Technology, Inc., and is referred to as a "Private Eye". Another type of solid state miniaturized display uses a two dimensional array of GaAs light emitting pn junctions, and has dimensions of just 7 mm by 4 mm. A refractive optical system magnifies the array by 15 so that, when held to the eye, a virtual image is displayed that is equivalent to a conventional 45.7 cm diagonal display viewed at a distance of 1.5 m. With these types of displays it may be desirable to eliminate the conventional telephone keypad 22 altogether, and to use the touch sensitive pad 23 as the user input device.

In the touchpad embodiment of FIG. 1B the controller receives the X-Y coordinate information from the touchpad 23, instead of from the display 20, and in all other respects may operate as described above in FIGS. 3, 4A and 4B.

Figure 5A:
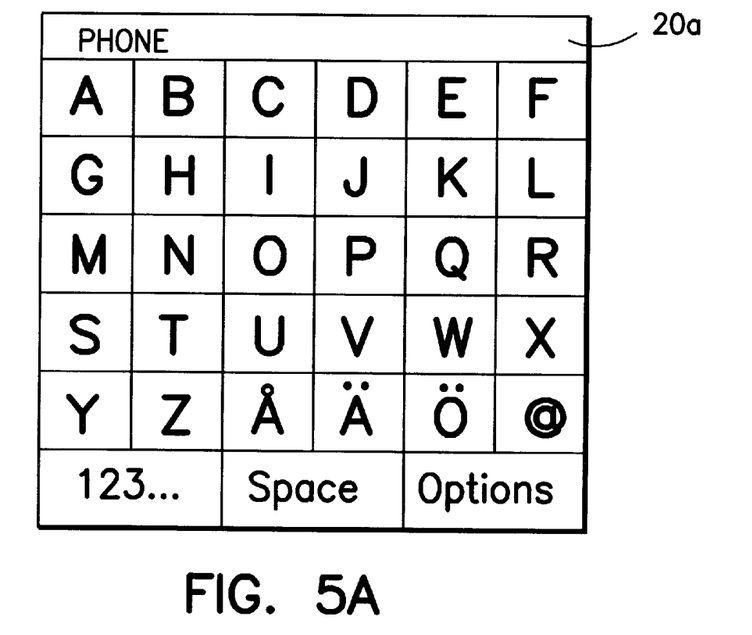
FIGS. 5A–5F illustrate exemplary displays useful in explaining the operation of this invention, as well as illustrating a presently preferred "fisheye" display magnification function.

Reference is now made to FIGS. 5A–5F for illustrating a further embodiment of this invention, specifically an alphanumeric input method using the dynamic touchscreen 20 as in FIG. 1A or the touchpad 23 as in FIG. 1B. When the user desires to enter alphanumeric characters a keyboard matrix is displayed on the display 20 (FIG. 5A). Selecting the @ symbol or "button" results in the display of special characters (FIG. 5F), selecting the "123 . . . " button results in the display of numeric characters (FIG. 5E), selecting the "ABC . . . " button of FIGS. 5E and 5F results in the display of the alpha matrix of FIG. 5A, while selecting the "Space" button creates a space character. Selecting the "Options" button results in the display of an option list to enable the toggling between upper/lowercase and other special features. The entered input is displayed in an entered text field 20a on the top of the displayed symbol matrix. In the illustrated embodiment of FIG. 5A the user has already selected five symbols to spell the word "PHONE".

The symbol matrix layout on the display 20 is designed according to the requirements of the device, the application, and any special language requirements. The specific layout shown in FIGS. 5A–5F is but one, non-limiting, example.

Figure 5B:
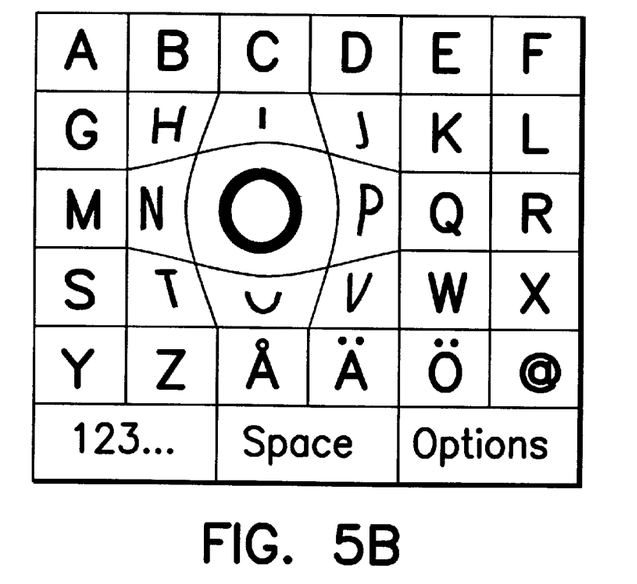
Figure 5C:
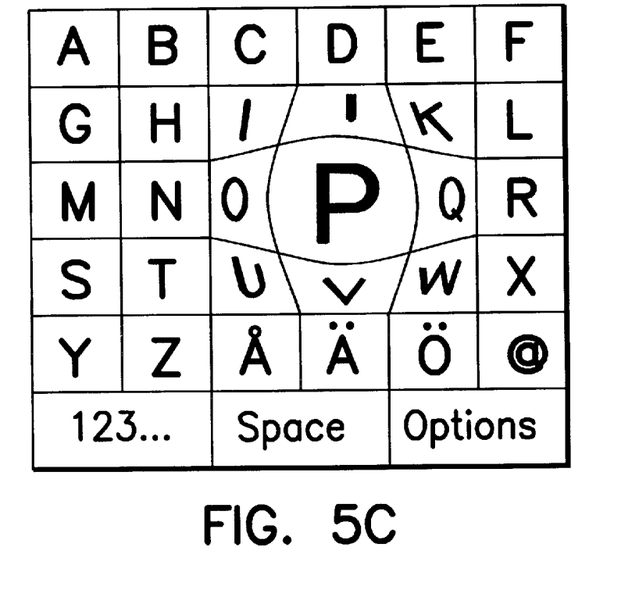
Figure 5D:
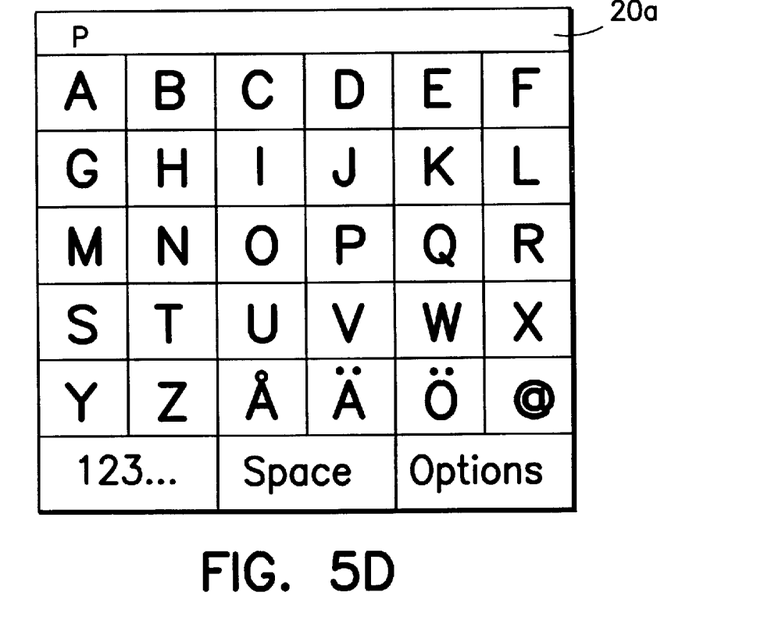

Referring to FIG. 5B, and in accordance with an aspect of this invention, when the user's fingertip location on the touchscreen display 20 or the touchpad 23 corresponds to, by example, the location of the "O" symbol, the display is modified as shown to provide a "fisheye" magnification effect.

The fisheye magnification effect corresponds to the effect that would be observed if a convex lens were placed on the display 20, with the center of the lens lying directly over the position that corresponds to the current location of the user's tactile input. In practice, the controller 20 may execute a suitable program that mathematically emulates or models the optical effect of a convex lens. This can be achieved by ray-tracing or by some other suitable mathematical transformation, wherein light rays originating from the underlying display pixels are traced through a virtual lens having a predetermined f-number. The resulting deviation of the light rays due to the effect of the virtual lens is then mapped to the display memory, and the resulting displayed image is as is shown in FIG. 5B. The basic idea is that the symbol button corresponding to the user's tactile input is magnified the most, and the magnification is gradually reduced towards the edges of the displayed symbol matrix. The symbol buttons at the edges of the symbol matrix may actually be displayed smaller than when no tactile input is present (as in FIG. 5A). It can be appreciated that this technique can be used to emulate any suitable type of lens, such as a cylindrical lens, and can thus provide a wide variety of display effects for the user.

The end result is that the user is given clear visual feedback of the location of the user's tactile input relative to the display 20. The magnification ratio is selected such that, preferably, the underlying magnified symbol is at least as large as the user's fingertip or stylus. The magnification ratio can be made a user-selectable function, and need not be constant.

The fisheye effect in accordance with this aspect of the invention solves the problems enumerated above by visually enlarging the symbol button that corresponds to the location of the user's fingertip or stylus input. The fisheye effect is graphically designed such that the selected symbol button is displayed the largest, and such that the sizes of the other symbol buttons decrease in proportion to their distance from the selected symbol button. This technique also facilitates the user correcting an erroneous fingertip placement, since the symbol buttons in the immediate neighborhood can be accessed with greater precision than symbol buttons farther away.

The fisheye effect remains active so long as the fingertip or stylus is applied to the touchscreen or touchpad 23, even when the user moves the fingertip or stylus. This makes it possible for the user to easily navigate about the symbol matrix. By example, in FIG. 5C the user has moved her fingertip from the "O" location to the "P" location, and the fisheye effect has followed the motion of the user's fingertip.

When the user then lifts the fingertip from the "P" symbol button (see FIG. 5D), the "P" symbol is selected, is displayed in the input text area 20a, and the fisheye effect is terminated, resulting in the symbol matrix being displayed in a normal fashion. The user may cancel the symbol selection operation by moving the fingertip outside of the symbol matrix area on the display 20.

Figure 5E:
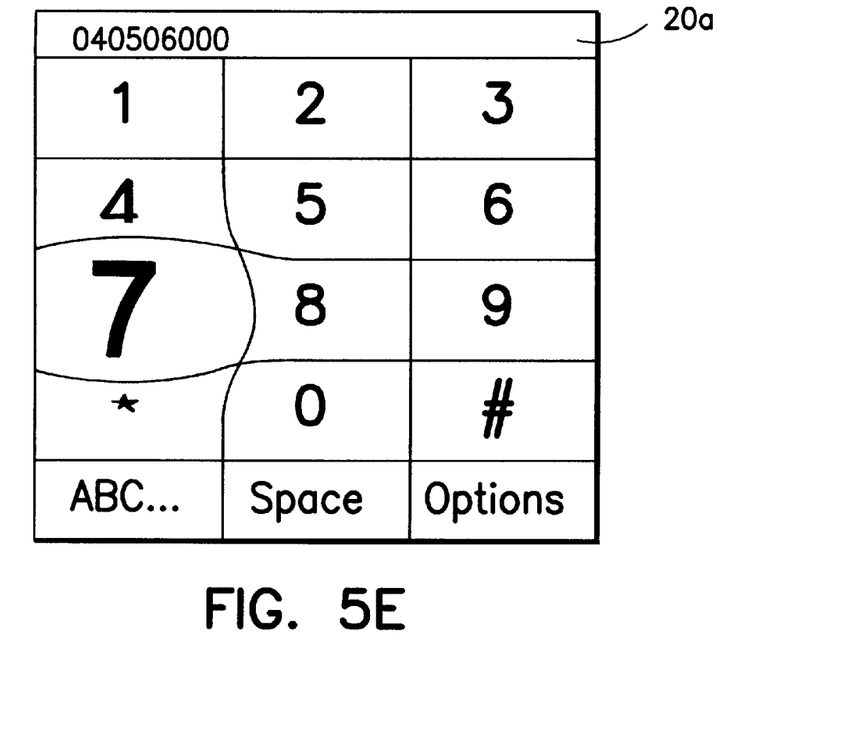
Figure 5F:
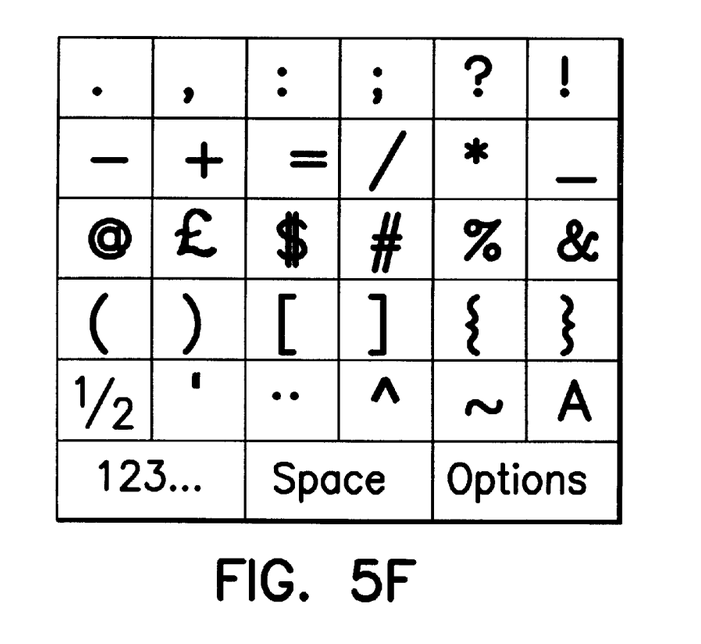

Interaction with the number and special character symbol matrices is the same as with the above-described alpha symbol matrix. In FIG. 5E it can be seen that the user has already selected the numbers "040506000", and is shown in the process of selecting the "7" symbol. By example, the user may dialing a telephone number.

It is also within the scope of this invention to display to the user a "virtual finger" symbol or icon on the display 20. The virtual finger icon is especially useful for the touchpad 23 embodiment, wherein the user's finger is not actually touching the display surface. The use of the virtual finger icon provides visual feedback to the user as to the spatial relationship between the location of the user's fingertip and the display screen. Any suitable icon shape can be used, and the icon need not resemble a finger. By example only, crosshairs can be displayed, with the crosshairs being centered on the current location of the user's fingertip or stylus.

Although the invention has been described in the context of preferred embodiments, it should be realized that a number of modifications to these teachings may occur to one skilled in the art. By example, the magnification need not be restricted to a single ratio as described. In fact, and as was mentioned above, the magnification ratio may be made a user-selectable function, thereby customizing the display interaction to the user's actual fingertip size. Second, multiple magnification steps or levels can be used, as described in step 406 of FIGS. 4A and 4B. For example, if the indicated position does not allow unambiguous identification of a symbol, the displayed symbols in the vicinity of the user's fingertip position can be automatically enlarged by a first increment, giving the user the opportunity to once more slide the fingertip to a desired symbol. This process can be repeated several times, with increasing levels of magnification. In yet another embodiment only a portion of the display surrounding or adjacent to a location where the fingertip is touching (for example 10 percent of the area of the display) is magnified, leaving the remainder of the display unchanged. This allows faster operation since fewer than all display characters need to be magnified and updated by controller 18. Furthermore, and for the embodiment of FIG. 1A, it should be realized that not all of the display 20 need be touch sensitive, or operated in a touch-sensitive manner. By example, a portion of the display 20 may be used in a conventional fashion for displaying user-selected symbols, prompts from the mobile station controller, a received SMS message, etc., while the remainder of the display 20 is operated as the user input device in accordance with this invention.

The teaching of this invention may also be applied to advantage to wireless communication devices in general, such as portable miniature digital data processors, such as a personal digital assistant (PDA) device, having an integral RF transceiver and/or a port for connecting to a suitable RF transceiver, such as a cellular telephone.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless communicator having a display and a touch sensitive input device, said display displaying a plurality of symbols, comprising the steps of:
   detecting a first location of a tactile input on the touch sensitive input device;
   magnifying one or more displayed symbols in the vicinity of the first location by emulating a presence of a lens element disposed between the display and the user such that magnification of the displayed symbols is non-linear within an area being magnified;
   detecting a second location of the tactile input after magnifying the displayed symbols;
   associating the second location of the tactile input with a selected symbol; and
   identifying the selected symbol as a user-designated input symbol.

2. A method for operating a wireless communicator as in claim 1, wherein the magnifying step magnifies the symbols in one or more magnification increments.

3. A method for operating a wireless communicator as in claim 1, wherein the magnifying step magnifies a symbol that corresponds to a current location of the tactile input so as to appear larger than all other displayed symbols.

4. A method for operating a wireless communicator as in claim 1, wherein the magnifying step is repeated a plurality of times with increasing magnification ratios.

5. A method for operating a wireless communicator as in claim 1, wherein the associating step is performed after a predetermined timeout period wherein a location of the tactile input does not change.

6. A method for operating a wireless communicator as in claim 1, wherein the associating step is performed after the tactile input is removed.

7. A method for operating a wireless communicator as in claim 1, wherein the magnifying step includes a step of displaying a user-selected symbol with a predetermined size, and displaying other symbols with a size that decreases in proportion to their distance from the user-selected symbol.

8. A user input device for a wireless communicator comprised of a touch sensitive display device, said display device displaying a plurality of symbols, said user input device comprising a controller bidirectionally coupled to said touch sensitive display device for detecting a first location of a user's tactile input on the touch sensitive display device and for magnifying one or more displayed symbols in the vicinity of the first location by emulating a presence of a lens element disposed over the touch sensitive display device so as to provide a localized magnification effect; said controller detecting a second location of the user's tactile input after magnifying the one or more displayed symbols and associating the second location of the user's tactile input with a selected symbol for specifying the selected symbol as a user-designated input symbol to a routine that will use the specified symbol as input.

9. A wireless communicator as in claim 8, wherein said touch sensitive display device is comprised of a touch sensitive surface.

10. A wireless communicator as in claim 8, wherein said controller magnifies a symbol that corresponds to a current location of the tactile input so as to appear larger than all other displayed symbols.

11. A wireless communicator as in claim 8, wherein said controller magnifies the one or more displayed symbols a plurality of times with increasing magnification ratios.

12. A wireless communicator as in claim 8, wherein said controller associates said second location with said selected symbol after a predetermined timeout period wherein a location of the tactile input does not change.

13. A wireless communicator as in claim 8, wherein said controller associates said second location with said selected symbol after the tactile input is removed.

14. A wireless communicator as in claim 8, wherein said controller magnifies said one or more displayed symbols by displaying a user-selected symbol with a predetermined size, and displaying other symbols with a size that decreases in proportion to their distance from the user-selected symbol.

15. A wireless communicator as in claim 8, wherein said controller is responsive to a user's tactile input on said touch sensitive display device for selecting and displaying one of a plurality of symbol matrices.

16. A wireless communicator as in claim 8, wherein said controller is responsive to a user's tactile input on said touch sensitive display device for displaying a predetermined pattern to indicate to the user a spatial relationship between the user's tactile input and a display.

17. A wireless communicator as in claim 8, wherein said touch sensitive display device is comprised of an LCD display.

18. A wireless communicator as in claim 8, wherein said touch sensitive display device is comprised of a projection display.

19. A wireless communicator as in claim 8, wherein said touch sensitive display device is comprised of an array of light emitters and an optical system for magnifying an output of said array of light emitters.

* * * * *